Feb. 13, 1940.   N. SCHNOLL   2,190,488
TESTING INSTRUMENT
Filed Aug. 2, 1935   3 Sheets-Sheet 1
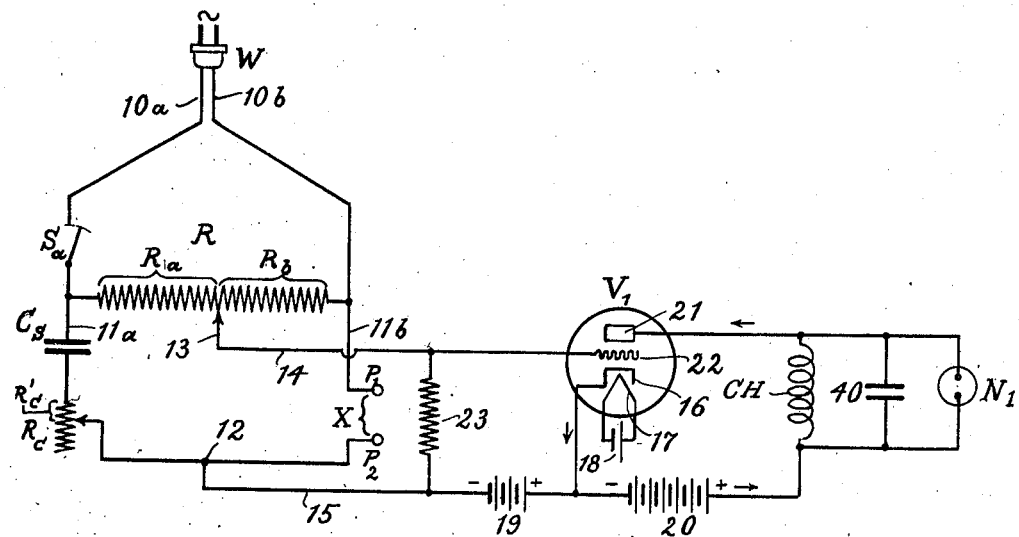
_Fig. 1._
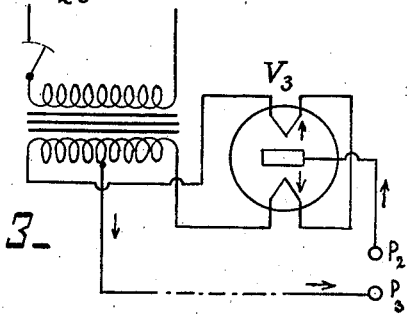
_Fig. 3._
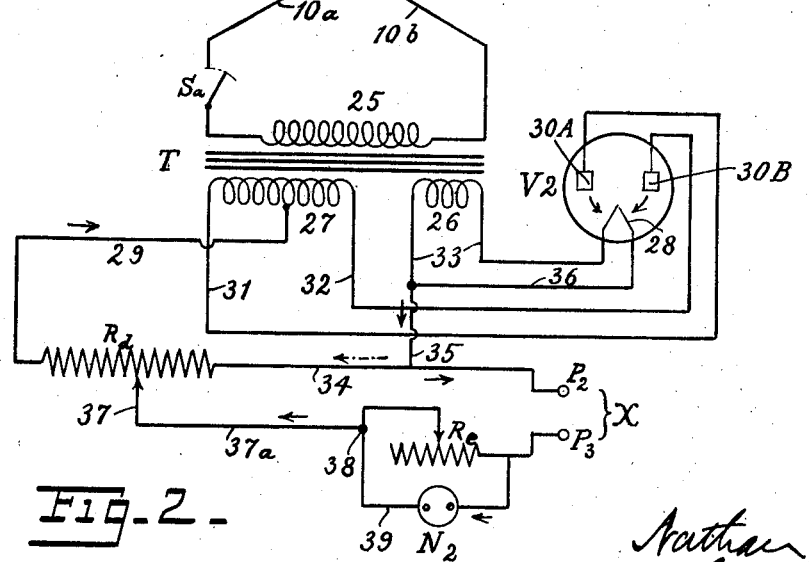
_Fig. 2._
INVENTOR.
Nathan Schnoll
BY Schechter & Luter
his ATTORNEYS.

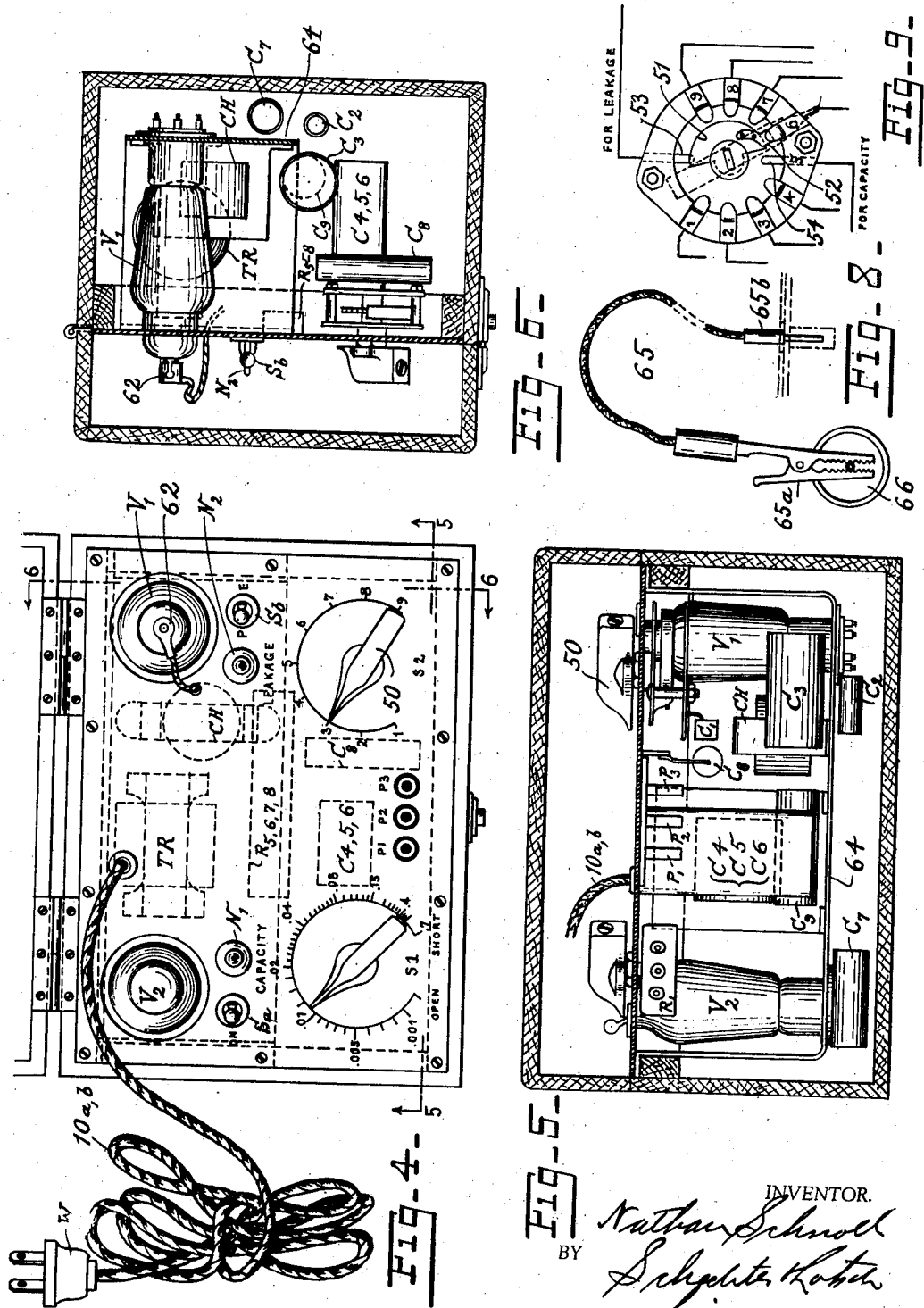

Patented Feb. 13, 1940

2,190,488

UNITED STATES PATENT OFFICE 2,190,488

TESTING INSTRUMENT

Nathan Schnoll, New York, N. Y., assignor, by mesne assignments, to Stevenson Corporation, New York, N. Y., a corporation of New York Application August 2, 1935, Serial No. 34,309

2 Claims. (Cl. 175—183)

This invention concerns improvements in testing instruments for electrical devices and components used for various purposes, and in particular of the kind used in radio receiving and broadcasting circuits, or in kindred arts. As far as the functions and qualities to be tested are concerned, instruments of the class to be described may be used to measure capacitance, inductance, impedance, resistance, and power factor. They can also be used to test short circuits, opens or leakage resistances.

From these characteristics it will be apparent that one of the principal applications of these particular testing instruments relates to condensers, be they electrolytic condensers, paperwound, mica condensers or such that use air as a dielectric. Furthermore, resistances, rheostates, coils, transformers or circuit connections in general come within the scope of these testing instruments, and therefore the latter may be used, broadly speaking, advantageously, as "trouble finders," for radio repair work or for accurate measurements in experimental work.

There have been a number of devices patented for testing and analyzing the capacity or the leakage of condensers and kindred apparatus, and the general principles and means of accomplishing this are well known; especially the use of a so-called Wien or Wheatstone bridge arrangement, where one arm of the circuit containing the apparatus or device to be tested is balanced against a standard of reactance, resistance or impedance in another arm for comparison, is a well established principle, and no broad claims as to the discovery or novelty of such principle per se is made by the applicant.

While the balance or rather the absence of such balance can be revealed in an audible way, for instance by the sound in a telephone receiver, caused by the potential difference at the detector terminals of the bridge when the arms are out of the proper adjustment, the alternative,—the indication of lack of balance by a visual signal viz: the lighting of an incandescent light by the out of balance current—seems less practical, because the available current is in most cases too weak to heat up a filament, and a detector depending upon these means would not appear sensitive enough to permit operation at the low energy levels available as the final balance point is approached. Even with audible detectors, such as are generally used with A. C. bridges, these instruments are not sensitive enough for very accurate practical analyses when such measurements are made at low frequencies such as 60 cycles. Another disadvantage inherent to the use of an ordinary bridge for routine testing of condensers is the necessity of applying separate instruments for separate tests,—one for determining capacity, another for a leakage test, or for voltage breakdown, and so forth.

The special improvements which the novel testing apparatus aims at are first, to combine several testing procedures into the employment of one single apparatus, and secondly, to devise novel means for singularly increasing the sensitivity of the detector of the bridge as well as to make possible a compact and economical structure for this portion of the circuit.

A final advantage of the novel apparatus is that it can be activated by plugging the main lead wires into a common A. C. current outlet, which by rectifying means, embodied in the construction, also furnishes D. C. current for the leakage test and the operation of the vacuum tube amplifier employed in connection with the bridge.

The first object of this invention therefore is to devise a testing instrument by which the general condition, i. e. the fitness or unfitness of an electrical device, such as a condenser, induction coil or rheostat, may be analyzed and determined conveniently and completely.

Another object of the invention is to provide an instrument of the kind described which may also be used for testing insulation (as to dielectric strength as well as safety) terminal strips, conductors and whole circuits, etc.

A further object is to provide an instrument of the kind described, which may be generally used by the radio repair man as a "trouble finder."

A further object is to devise an instrument of the kind described which is sensitive enough to be used as a precision measuring instrument, without being essentially delicate or difficult to control.

Another object of this invention is to devise a testing instrument by which the capacitance as well as the amount of leakage, if any, may be tested and measured for an electrical device, such as a condenser of any description.

Another object is to provide a testing instrument for determining capacity or resistance, utilizing a Wien bridge arrangement and a visual balance indicator of improved sensitiveness.

A further object in compass with the one mentioned is to devise an improved testing instrument for capacity or resistance, utilizing a Wien bridge arrangement, a neon lamp, energized by the balance current of the bridge and amplifying means for the lighting circuit of said lamp.

A further object is to devise a testing instrument of the kind described which utilizes A. C. current from a power line source in connection with its Wien bridge arrangement.

Another object of the invention is to devise a testing instrument of the kind described, so arranged that an A. C. current not only is used for energizing the device under test together with the standard used for comparison but also the visual indicator together with the amplifying means.

A subservient object is to provide rectifying means in a testing instrument of the kind described which converts the alternating current, furnishing the initial energization, into a direct current where needed, eliminating thereby the employment of extra batteries.

A further object is the combination and coupling of two circuits, one adapted to test capacitance and the other to test leakage, into a partly overlapping network, energized from the same electrical source and partly using common testing and operating means.

A final object is to increase the sensitiveness of the testing apparatus for the purposes described by inserting an amplification stage between the Wien bridge arrangement and the visual indicators for any balance current emanating from the bridge.

Other objects and advantages will become apparent from a more detailed description of my invention, an illustrative embodiment of which is shown in the accompanying drawings, in which Fig. 1 shows a wiring diagram, illustrating the basic principle employed for that part of the testing apparatus which determines the capacitance.

Fig. 2 shows a wiring diagram, illustrating the basic principle employed for that part of the testing apparatus which determines the leakage and dielectric strength of the condenser.

It is, however, to be observed that these diagrams do not exhibit the exact final wiring of the combination instrument as subsequently built and described, but rather the fundamental ideas on which the actual wiring is based, as for instance, the use of batteries shown in the first diagram as well as that of the balancing resistor is in practice eliminated, as was pointed out in the objects listed. Also, some elements shown separately in the two diagrams, are in practice made common to both circuits while others, as for example the potentiometer in the second diagram, is employed in modified form.

Fig. 3 illustrates a modification of the rectifying tube V₂.

Fig. 4 is a top view of an actual testing instrument, built according to the principles of the invention and showing the panel face. The lid of the container is removed and the location of the main elements below the panel is shown in dotted lines.

Fig. 5 is a transverse section through the box along line 5—5 of Fig. 4. The main elements are indicated more or less diagrammatically, the wiring being omitted.

Fig. 6 is a similar cross section along line 6—6 of Fig. 4.

Fig. 8 is a detail of a test lead, showing how thereby the device under test is connected to the testing apparatus.

Fig. 9 is a detail of the S₂ switch.

*Diagrams showing the basic principles*

Figure 7:
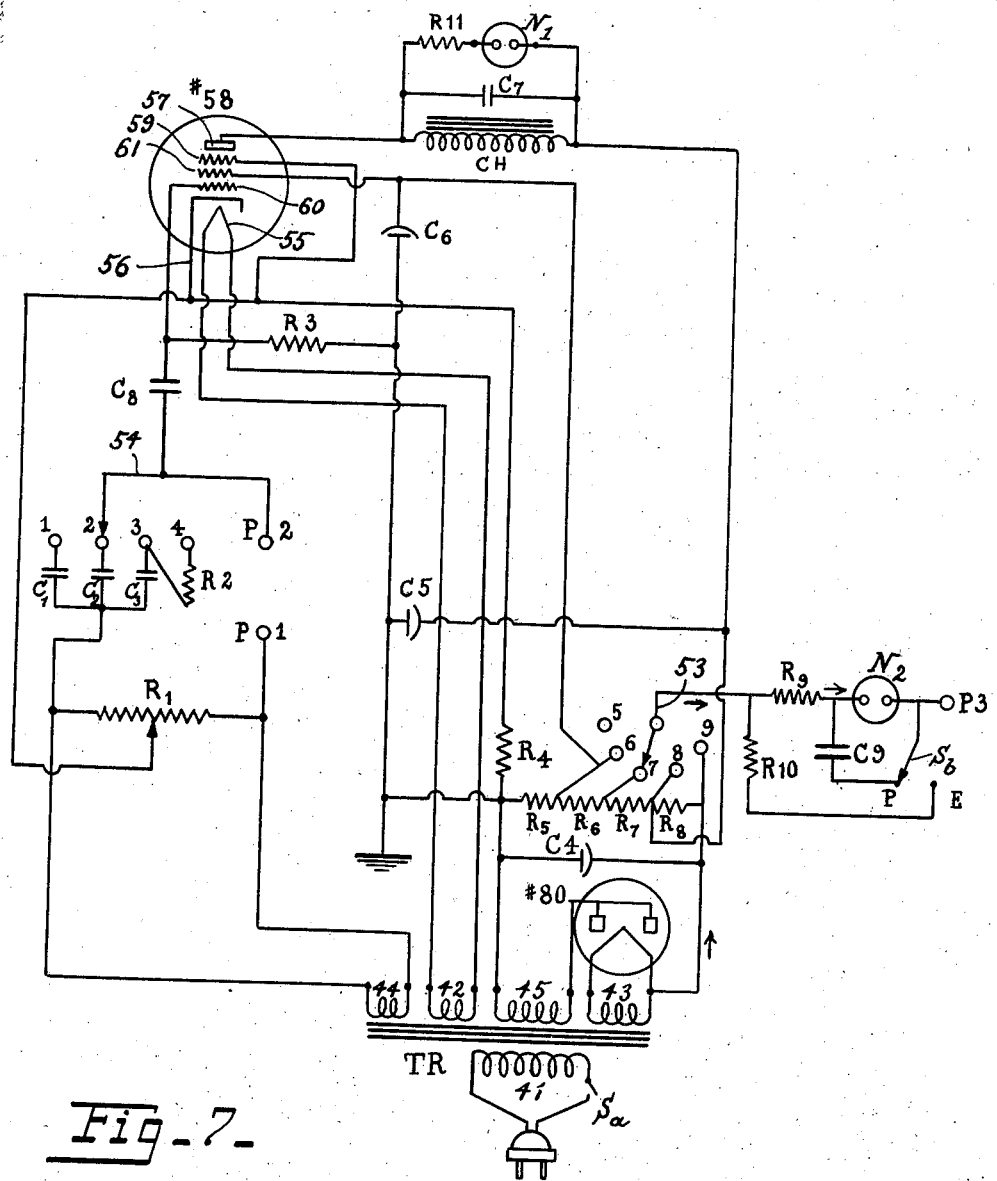
Fig. 7 is a final wiring diagram, showing a combination of the basic diagrams (Figs. 1 and 2) with the modifications pointed out.

Referring more in detail to the different diagrams, W designates a two-prong plug of the standard pattern, such as is used for plugging in electrical household articles or the feed wires of a so-called electrified radio receiving set into a wall outlet of the A. C. house service current or, using an intermediate screw plug, into a lamp socket. To this is attached a two-conductor cord 10a, b of appropriate length, leading to the testing apparatus, and, as will be explained later, this plugging-in appliance is identical and common to both circuits, shown in Figs. 1 and 2, only one being actually used. Referring to Fig. 1, the two strands 10a and 10b lead to a Wien bridge, comprising the bridge resistance R, the variable balance resistor Rc, and the two branches 11a and 11b, leading to the common point 12. Somewhere between the plug W and the resistance R is provided a main switch Sa in either one of the feed wires 10a or 10b. One of the branches contains a gap with two plug-in terminals P1, P2, into which the test leads for the condenser or other appliance to be tested may be inserted, and the other branch (which also contains the balance resistor Rc) is normally provided with a fixed condenser Cs of an optional standard capacity. If, however, instead of for capacity the test is to be made for other electrical properties, for instance for inductance or resistance, then other standards having the proper inductance or resistance are substituted. A slidable pointer 13 which leads to the detector circuit through the wire 14, and the fixed wire 15 through which the eventual balance current returns from the detector, yet to be described, to the junction 12, completes the bridge arrangement. The operating principle of this so-called Wien bridge is well known. Balance is obtained by adjusting the slider 13 and resistance Rc. If we call the operative length to which the balance resistor Rc is adjusted, R'c and the two resistances, into which the slidable pointer 13 divides the total resistance R: Ra and Rb respectively, and if Cs designates the standard capacity and X the capacity in microfarads, to be tested, then $$X = \frac{R_a}{R_b} C_s$$

If we designate the effective resistance of the unknown condenser as Rx then $$R_x = \frac{R_b}{R_a} R'_c$$

At balance there will be no A. C. potential difference between points 13 and 12 and no voltage will therefore be applied to the detector circuit. When this adjustment is reached, the neon lamp, as will be later on explained, will not light up, or if previously lit, will extinguish. By measuring the ratio of Ra to Rb for each position of the slider 13 on R as indicated by a pointer attached to this slider the capacitance of the condenser under test may be determined.

The detector device comprises an amplifying tube V₁, the grid circuit of which is connected to points 12 and 13. In the plate circuit of this tube is a tuned circuit across which is connected the neon lamp N₁. The amplifying tube shown has a cathode member 16 which is indirectly heated by the separate filament 17, which latter is connected to the "A" battery 18. The cathode is connected to the positive pole of the "C" battery 19 and the negative pole of the "B" battery 20. The positive pole of the latter is connected through the tuned circuit, which contains the fixed condenser 40 and the choke coil CH, in parallel, to the plate 21 of the tube $V_1$. Between the plate and the cathode is positioned the control grid 22 which is connected to lead 14. Leads 14 and 15 are interconnected by the grid resistance 23.

When the slider 13 is positioned on resistance R so that a potential difference is obtained with respect to point 12 of the bridge circuit, this voltage is impressed upon the grid 22 of $V_1$ with respect to the cathode 16. This A. C. voltage is amplified by the tube in a manner well known to the art and appears in the plate circuit across the choke CH which is turned to resonance, with the A. C. voltage, used as the bridge source, by means of the fixed condenser 40. If any amplified voltage appears across the tuned circuit, so that the neon lamp $N_1$ lights up, is an indication that the bridge is not balanced. By manipulating the position of the slider 13 on R, while at the same time adjusting the phase angle of the standard arm by means of $R'_c$ a point is reached where there is no potential difference between 12 and 13. Under this condition the neon lamp $N_1$ will extinguish since no A. C. voltage appears across its terminals, thereby indicating that the bridge is balanced. From the pointer and scale which may be affixed to the slider 13 and the resistance $R_c$ the capacity and power factor of the unknown device may be read directly, if these elements are calibrated.

While in the circuit arrangement described an amplifier tube is included between the detector arms of the bridge and the visible indicator, for some practical purposes the neon lamp may be directly connected to the detector terminals of the bridge, omitting the amplifier. Furthermore other visual indicators such as cathode ray tubes, mercury vapor glow lamps or similar sensitive electrically operated light sources may be utilized instead of the neon lamp, with or without the amplifier, and are therefore claimed as coming within the scope of my invention.

The fundamental arrangement for the leakage test is shown in Fig. 2. The test consists of applying a suitable D. C. voltage to the condenser or other appliance to be tested. The condenser under test is connected to the plug-in terminals $P_2P_3$ and the leak-indicating current goes through the neon lamp $N_2$.

This direct current source could of course be obtained from a dry battery, but for economical reasons as well as for convenience it will be better to derive this current from an A. C. source through rectification. Any suitable rectifying tube with appropriate circuit could be employed for this purpose; for example, one with a hot filament and a cold plate and of this class either one whose action depends on ionized gas (Tungar, Rectigon tube, etc.) or on true thermionic action (like the one shown in Fig. 2) or finally also one of the two cold element types (Raytheon "S" tube). The thermionic vacuum tube $V_2$ shown therefore should be considered as illustrative only. It will also be advantageous, though not indispensable, to use a rectifying tube which converts the full wave into one direct current, yet for ultimate results it would be immaterial whether a tube $V_3$ with one plate and two opposite filaments, like the one indicated in Fig. 3, or a tube with one filament and two plates, like $V_2$, is used.

Referring in detail to Fig. 2, the A. C. service current is led from the aforesaid plug W and over the closed switch $S_a$ through the primary 25 of the transformer T. The secondary coil consists of two portions. One portion 26 is used to supply an alternating current to heat up the filament 28 and has just enough turns to provide the proper voltage required by the tube employed. The other portion 27 of more turns is tapped in its center by the lead 29 which leads to the resistance $R_d$.

The two ends of the winding 27 are connected by the leads 31 and 32 to the plates 30A and 30B respectively. The rectified voltage is applied across the resistor $R_d$ by leads 29 and 35. This arrangement of the rectifier being well known to the art, further explanation is unnecessary.

The resistance $R_d$ is tapped by the variable pointer 37 and the tap lead $37_a$ is connected at 38 to the neon lamp $N_2$, and the variable resistance $R_e$ in parallel. The other side of the neon lamp and resistance $R_e$ are connected to test terminal $P_3$. When a condenser is connected to terminals $P_2$ and $P_3$ the leakage current through the condenser flows through the resistor $R_e$. If the leakage current is high enough the voltage drop across $R_e$ will be sufficient to ignite the neon lamp. The value of leakage current required to ignite the neon lamp will of course depend upon the setting of the resistor $R_e$. The applied voltage can be adjusted to any desired value, suitable for the condenser under test, by means of the potentiometer $R_d$, and if the leakage current then exceeds any allowable or accepted value, the neon lamp $N_2$ will light up.

*Wiring diagram of complete analyzer*

The wiring diagram for a complete analyzer for capacity as well as leakage of condensers and for performing similar tests for kindred electrical devices, built according to the principles of this invention and shown in Fig. 7, is based upon the two fundamental diagrams just shown, but in order to join the two circuits cooperatively together and to provide a handy and practical testing unit so that these service tests, which together determine the fitness or unfitness of a condenser or similar device for a certain purpose and a certain electrical circuit, can be carried out quickly and conveniently, a number of modifications and even deviations from the basic diagrams were introduced which will be shortly pointed out before going into details of the combination arrangement.

In the first place a single transformer is used as the source of the A. C. current for both functions of the test circuit. Two secondaries of the transformer TR having a primary winding 41 each with the proper number of turns, heat the filaments of the vacuum tubes, viz: 42 for the bridge amplifying tube and 43 for the rectifying tube which furnishes the D. C. supply. There are provided three fixed standard condensers $C_1$, $C_2$, $C_3$ and resistance $R_2$ which can be inserted in series with $C_3$ at option. The source current for the bridge is furnished by the secondary 44. A fourth secondary, 45, provides the high voltage for the rectifying tube and filter which includes the electrolytic condenser $C_4$. Half wave rectification of the A. C. current is used in this case. Again, in the leakage test, instead of using a potentiometer 27 and two variable resistances $R_d$ and $R_e$ there are provided four fixed resistances $R_5$, $R_6$, $R_7$ and $R_8$, which can be tapped at option at the contacts 6, 7, 8 and 9 respectively to obtain the desired voltage for test. Contact 5 is an open position. These constitute the main modifications of the basic wiring diagrams. The capacity measurement range of this particular instrument is from .00001 to 70 microfarads although there is no difficulty in revising or extending this range to cover other capacity measurements. The vacuum tubes employed are one "80" tube ($V_2$) for rectifying the current and one "58" amplifier tube ($V_1$). The capacity dial "$S_1$", representing the potentiometer $R_1$, is calibrated directly in the medium capacity range while the other ranges are obtained by multiplying or dividing the capacity readings on the scale by 100, for the high and low capacity ranges respectively. See Fig. 4. A dial chart, supplied with the instrument, makes computation generally unnecessary.

The settings for the standard capacitor contacts 1, 2, 3 and 4, used for the capacity test and for the leakage test contacts 6, 7, 8 and 9 are combined on the single dial "$S_2$" and the contacts are made at option by turning a pointer 50 which operates a rotatable snap switch whose underside is illustrated in Fig. 9. A semi-circular segment 51 is axially coupled with the pointer, and a tongue 52, fastened thereon, successively can make contact with the differential terminals 1 to 9. It will be seen from Fig. 9 that as long as the segment through its tongue makes contact with either of the terminals 6 to 9, the circuit is connected to conductor 53 which leads toward the neon lamp circuit for the leakage test, while if the pointer with the segment and the tongue 52 is turned toward one of the terminals 1 to 4, the path of the current goes over the conductor 54 which leads toward the amplifying stage of the capacity tester. Positions 6, 7, 8 and 9 are for condensers having working voltage ratings of twenty to five hundred volts respectively. The procedure in tabular form for capacity measurements of condensers is as follows:

| Approximate capacity | Setting of "S–2" | To determine capacity— |
|---|---|---|
| .00001 to .007 mfd | 1 | Divide reading by 100. |
| .001 to .70 mfd | 2 | Read directly. |
| .10 to 70.0 mfd | 3 | Multiply reading by 100. |
| .10 to 70.0 mfd | 4 | Do. |

On account of the normally higher power factor of electrolytic condensers, these should be tested as a rule with the pointer in the position 4 of switch "$S_2$" whereby an additional resistance $R_2$ is inserted into the circuit in series with standard #3 (Fig. 7).

The "58" amplifier tube is similar to $V_1$ in Fig. 1, but besides the filament 55, the cathode 56 and the plate 57, it contains three grids,—the screen grid 59, the control grid 61 and the suppressor grid 60. The control grid connection is made by means of the grid cap 62 (see Figs. 4 and 6) which is in turn connected to the fixed condenser $C_8$ and the resistance $R_3$. It remains to mention also the switch $S_b$ by which the resistance $R_{10}$ may be placed in shunt with the neon lamp $N_2$ and which is used whenever electrolytic condensers are tested for leakage. This resistance is selected arbitrarily so that the voltage drop across it will be sufficient to ignite the neon lamp $N_2$, only when high leakage condensers are being tested.

All three electrolytic condensers $C_4$, $C_5$, $C_6$, forming the filter system, are mounted in one common container, as Figs. 4 and 5 show.

The following are the capacities of the fixed condensers and the resistances used in the circuit of the 110 volt 60 cycle analyzer, which were arrived at on the basis of practical experience as suitable for general use.

The capacities of the condensers are given in microfarads.

$C_1=.002$; $C_2=.02$; $C_3=2$; $C_4=2$; $C_5=4$; $C_6=4$; $C_7=.1$; $C_8=.25$ and $C_9=.5$ mf.

The resistances are given in ohms:

$R_1=2000$; $R_2=350$; $R_3=1,000,000$; $R_4=500$; $R_5=10,000$; $R_6=10,000$; $R_7=10,000$; $R_8=5,000$; $R_9=250,000$; $R_{10}=30,000$ and $R_{11}=250,000$ The other features of the wiring diagram shown in Fig. 7 are easily understood by those skilled in the art through a comparison with the basic diagrams above explained.

The views of the assembled instrument, shown in Figures 4, 5 and 6, show the location of most operating members with the inside wiring omitted which can be supplied according to the wiring diagram, but with the exception of $R_1$ and $R_5$ to $R_8$ no resistances are shown, as these can be installed at any convenient place or attached to the supporting frame 64.

*General method of operating the testing instrument*

With the standard "58" and "80" tubes inserted into their respective sockets, the line plug W is connected to a power outlet of the proper voltage and frequency. The grid cap 62 at the end of the wire coming through the panel is placed over the protruding end of the suppressor grid 60. After the toggle switch $S_a$ is snapped to the "on" position, the pointer of the dial "$S_2$" is rotated to position "5". As this is the neutral position and no voltage is applied to the testing terminals, connections can be made without any danger of shock. After allowing about one minute for the tubes to heat up, the leakage test should first be proceeded with.

*Leakage test on condensers*

Two test leads, one red, meant for the positive terminal of (electrolytic) condensers, and one black for the negative terminal, are furnished with each instrument and one of them is illustrated by 65 in Fig. 8. The free end clips 65a should be securely attached to the condenser 66 in the manner shown or to the leads of whatever other appliance is to be tested. In similar manner the clips may be attached to two separate points of a circuit, between which a break or short circuit or leakage is suspected; while the tips of the test leads are plugged into the holes $P_2$, $P_3$ in the panel of the test instrument. Then the rotary switch $S_2$ is moved from position 5 to position 9 for fixed paper, oil or mica condensers of less than 1.0 mfd. indicated capacity or to position 7 for those of between 1.0 and 70.0 mfd. and the toggle switch $S_b$ is set to P. Then the indication given by the neon glow tube, marked "Leakage" should be observed. If no glow or periodic flashes not exceeding a rate of once per second are perceived, no serious leakage exists in the tested appliance. A steady glow or flashes exceeding the above given rate indicate a short circuit or leakages higher than may be tolerated. Open condensers will be detected by the capacity test.

Electrolytic condensers are tested for leakage as follows: After the red test lead is attached to the positive terminal and its tip plugged into "P₃" and the black test lead attached to the negative terminal and plugged into "P₂", the toggle switch S_b is snapped toward position E. The pointer 50 is switched to either of the positions 6 to 9 according to the indicated working voltages, as follows:

| Working volts | Peak volts | Position of "S—2" |
|---|---|---|
| 20–90 | 25–110 | 6 |
| 90–275 | 110–300 | 7 |
| 275–350 | 300–400 | 8 |
| 350–500 | 400–600 | 9 |

If the neon glow lamp N₂ shows a dull red glow which is extinguished within one minute, the condenser can be considered satisfactory. If such condensers have been out of service for long periods of time, they may require up to five minutes before the neon lamp dims down to acceptable leakage value. If it should require longer than five minutes to "re-form," the operation may be speeded up by temporarily switching S₂ to the highest voltage position 9, and then back to the correct tap about every 30 seconds. If the lamp N₂ does not extinguish at the end of the test period, the condenser should be discarded.

Capacitance test on condensers

The test leads are inserted into the holes P₁, P₂ for this measurement. The proper setting of the pointer 50 depends upon the approximate capacity of the condenser to be tested and is one of the positions from 1 to 4 of switch "S—2". This information has been given before, as well as the rule by which the capacity reading should be interpreted. After "S—2" is turned to the proper position, the pointer of dial "S—1" should be slowly moved from "open" position clockwise until the glow in the neon tube N₁, marked "Capacity" dims to its lowest intensity or is extinguished completely. The capacity can then be read from the scale of "S—1". For small capacities the apparent balance may be slightly broad, and the accurate capacity should then be estimated from the middle position of the pointer.

With electrolytic condensers, having a high power factor, a balance cannot always be obtained with "S—2" in position 3. If therefore there is no noticeable change in the brilliancy of the neon lamp, position 4 should be used, as pointed out before.

An indication of the power factor is given by the intensity of the glow of the capacity neon lamp when the final balance is made. When the power factor is satisfactorily low the neon lamp will extinguish entirely, especially for the position 1, 2 or 3. The greater the intensity of light, remaining after balance is obtained with "S—2" in position 1, 2 or 3, the higher the power factor.

Condensers which will balance only on the "open" or "short" positions should be replaced as defective.

In testing condensers of low capicity, about .0001 mfd. or lower, the leads to the condenser under test should be kept short. Best results in such cases will be obtained by plugging the ends of such condensers directly into the pin-jacks.

Miscellaneous applications

In addition to the routine tests, previously described, this test instrument may be used for many other applications in the laboratory and shop. Some of these uses are enumerated below:

The insulation resistance between coil windings of transformers, wires in cables, terminal strips, etc., may be measured easily. This is done by connecting the test leads from pin jacks "P—2" and "P—3" to the devices to be tested. The right-hand toggle switch is set at "P", first putting switch "S—2" in position 9, and switch "S—1" at "short". The insulation resistance may be determined from the number of flashes per minute of the "leakage" neon lamp by applying the following formula:

N = Number of flashes per second.
R = Leakage resistance in megohms.

$$R = \frac{30}{N}$$

To check the insulation resistance of terminal strips one of the test lead clips from "P—2" should be connected to any of the terminals on the strip; the other test clip connected to "P—3" should be touched to the fibre or other insulating material of the terminal strip about ⅛" to ¼" from the terminal lug. The resulting flashes of the neon "leakage" lamp may be interpreted as described above to determine the leakage.

Continuity tests may be performed with this test instrument by connecting the test leads to terminals "P—3" and "P—4". Set switch "S—2" at position 6 and "S—1" at short. For test of very high resistance circuits the right hand toggle switch is set at "P"; for all other circuits this toggle switch is set at "E". This set-up permits rapid circuit tests of radio receivers, and other devices and component parts.

The working method described above is to be taken only as illustrative for the most common usage of this testing instrument, as there are many occasions where a modified working method may advantageously suggest itself, based upon the general principles set forth, as will be well understood by those versed in the art.

In accordance with the provisions of the patent statutes, I have described my invention, but I desire it understood that it is not confined to the particular form shown and described, the same being merely illustrative, and that the invention can be carried out in other ways without departing from the spirit of my invention, and therefore, I claim broadly the right to employ all equivalent instrumentalities coming within the scope of the appended claims, and by means of which objects of my invention are attained and new results accomplished, as it is obvious that the particular embodiments herein shown and described are only some of many that can be employed to attain these objects and accomplish these results.

Having now described my invention, what I claim and desire to secure by Letters Patent, is:

1. In a device for measuring the capacity and power factor of a condenser, an alternating current bridge having source and detector terminals; said bridge consisting of two resistors and standard and unknown capacitor arms; said resistors being in the form of a potentiometer connected between the source terminals of the bridge, the adjustable slider of the potentiometer being used as one of the detector terminals of the bridge; an amplifier tube and associated elements; a blocking condenser connected between the grid of said amplifier tube and the common terminal of the capacitor arms of said bridge, the cathode of said amplifier tube being connected to the slider of said potentiometer, the output of said amplifier being connected to an indicator.

2. In a device for measuring the capacity and power factor of a condenser, an alternating current bridge having source and detector terminals; said bridge consisting of two resistors and standard and unknown capacitor arms; said resistors being in the form of a potentiometer connected between the source terminals of the bridge, the adjustable slider of the potentiometer being used as one of the detector terminals of the bridge; an amplifier tube and associated elements; a blocking condenser connected between the grid of said amplifier tube and the common terminal of the capacitor arms of said bridge, the cathode of said amplifier tube being connected to the slider of said potentiometer, the output of said amplifier being connected to an indicator; a fixed resistor and switching means for inserting said fixed resistor in series with the standard condenser arm for estimating the power factor of the condenser under test.

NATHAN SCHNOLL.